(12) United States Patent
Smit

(10) Patent No.: US 7,415,078 B2
(45) Date of Patent: Aug. 19, 2008

(54) DEMODULATION FOR PHASE MODULATION

(75) Inventor: Gerrit Smit, Hertme (NL)

(73) Assignee: Telefonaktiebolaget L M Ericsson (PUBL), Stockholm (DE)

( * ) Notice: Subject to any disclaimer, the term of this patent is extended or adjusted under 35 U.S.C. 154(b) by 862 days.

(21) Appl. No.: 10/850,687

(22) Filed: May 21, 2004

(65) Prior Publication Data

US 2004/0252788 A1 Dec. 16, 2004

Related U.S. Application Data

(63) Continuation-in-part of application No. 10/459,604, filed on Jun. 12, 2003, now Pat. No. 7,245,672.

(60) Provisional application No. 60/392,112, filed on Jun. 27, 2002.

(51) Int. Cl.
*H03D 3/22* (2006.01)
*H04L 27/22* (2006.01)

(52) U.S. Cl. .................. 375/330; 375/283; 375/329; 375/279; 329/300; 329/304

(58) Field of Classification Search ............ 375/329, 375/279, 336, 330, 274, 283; 329/300, 304
See application file for complete search history.

(56) References Cited

U.S. PATENT DOCUMENTS

| 5,062,123 | A |   | 10/1991 | Geile et al. |
|---|---|---|---|---|
| 5,151,925 | A |   | 9/1992 | Gelin et al. |
| 5,255,290 | A |   | 10/1993 | Anvari |
| 5,434,889 | A |   | 7/1995 | Baier |
| 5,802,117 | A |   | 9/1998 | Ghosh |
| 5,960,040 | A | * | 9/1999 | Cai et al. ............ 375/279 |
| 6,347,126 | B1 |   | 2/2002 | Nagayasu et al. |
| 6,363,131 | B1 |   | 3/2002 | Beidas et al. |
| 6,389,040 | B1 |   | 5/2002 | Viswanathan |
| 6,393,068 | B1 |   | 5/2002 | Rupp |
| 6,393,073 | B1 |   | 5/2002 | Eilts |
| 6,658,067 | B1 | * | 12/2003 | Piirainen et al. ........ 375/308 |

(Continued)

FOREIGN PATENT DOCUMENTS

EP 0 671837 9/1995

(Continued)

OTHER PUBLICATIONS

B. K. Poh et al; "A High Data Rate MDPSK Receiver Architecture for Indoor Wireless Application"; IEEE, vol. 4, Sep. 15, 2002, pp. 1718-1721.

(Continued)

*Primary Examiner*—Phuong Phu
(74) *Attorney, Agent, or Firm*—Michael Cameron

(57) ABSTRACT

A method and pre-processor for processing a MCPM signal including a phase multiplier for multiplying a MCPM signal by a scaling factor. The pre-processor also includes a frequency shifter for shifting the scaled MCPM signal to create a frequency offset. The pre-processing allows a MDPSK demodulator to demodulate the received MCPM signal. This Abstract is provided to comply with rules requiring an Abstract that allows a searcher or other reader to quickly ascertain subject matter of the technical disclosure. This Abstract is submitted with the understanding that it will not be used to interpret or limit the scope or meaning of the claims. 37 CFR 1.72(b).

28 Claims, 15 Drawing Sheets

U.S. PATENT DOCUMENTS

| | | | |
|---|---|---|---|
| 7,245,672 B2 * | 7/2007 | Smit | 375/330 |
| 2001/0031022 A1 | 10/2001 | Petrus et al. | |
| 2002/0094048 A1 | 7/2002 | Simmons et al. | |
| 2003/0214608 A1 * | 11/2003 | Provost | 348/726 |

FOREIGN PATENT DOCUMENTS

| WO | WO 02/37744 | 5/2002 |
|---|---|---|
| WO | WO 02/39688 | 5/2002 |
| WO | WO 2004/004268 | 1/2004 |

OTHER PUBLICATIONS

Data-Aided Noncoherent Demodulation of DPSK; by Harry Leib; IEEE Transactions on Communications, vol. 43, No. 2/3/4; Feb./Mar./Apr. 1995; pp. 722-724.

Digital Phase Modulation; by John B. Anderson et al.; Signal Analysis and an Overview of Modulation Methods; 3 pages, unknown date.

Fonollosa, J.R. et al., "Analysis of CPM Signals using Higher-Order Statistics", Military Communications Conference, 1993. Milcom 1993. Conference Record. Communications on the Move, IEEE Boston, MA, Oct. 11-14, 1993, New, NY, IEEE. (pp. 663-667).

Fonollosa, J.R. et al., "Estimation of the Modulation Index of CPM Signals Using Higher-Order Statistics", Statistical Signal and Array Processing, Minneapolis, Apr. 27-30, 1993, Proceedings of the International Conference on Acoustics, Speech, and Signal Processing, New York, IEEE, US, vol. 4, Apr. 27, 1993, (pp. 268-271).

Motorola's Bluetooth Solution to Interface Rejection and Coexistence with 802.11 by Weizhong Chen, Ph.D.; Copyright Motorola, Inc., 2001; 14 Pages.

Fractionally-Spaced Differential Detection of GFSK Signals with Small h* by Sukkyun Hong and Yong-Hwan Lee; IEICE Trans. Commun., vol. E-84-B, No. 12; Dec. 2001; 9 Pages.

Non Data Aided Estimation of the Modulation Index of Continuous Phase Modulations by Pascal Bianchi, Philippe Loubaton and Francois Sirven; Jan. 28, 2003; 30 Pages.

Differential Detection with IIR Filer for Improving DPSK Detection Performance by Naokazu Hamamoto; IEEE Transactions on Communications, vol. 44, No. 8 (Aug. 1996); pp. 959-965.

* cited by examiner

DEMODULATION FOR PHASE MODULATION

CROSS-REFERENCE TO RELATED APPLICATIONS

This application is a Continuation-in-Part of U.S. patent application Ser. No. 10/459,604 filed Jun. 12, 2003 now U.S. Pat. No. 7,245,672. U.S. patent application Ser. No. 10/459,604 claims the benefit of priority from U.S. Provisional Patent Application No. 60/392,112, filed on Jun. 27, 2002. This patent application incorporates by reference the entire disclosures of U.S. Provisional Patent Application No. 60/392,112, U.S. patent application Ser. No. 10/459,604, and U.S. patent application Ser. No. 10/603,469 filed on Jun. 25, 2003.

BACKGROUND OF THE INVENTION

1. Technical Field of the Invention

The present invention relates generally to the field of wireless technology and, more particularly, to a method of and system for demodulators in digital radio receivers.

2. Description of Related Art

Modulation methods in wireless technologies such as, for example, terrestrial and satellite mobile communications and short-range wireless systems such as BLUETOOTH, may be M-ary differential encoded phase shift keying (MDPSK) modulation or Continuous Phase Modulation (CPM) for transmitting data packets. MDPSK is typically employed because of its advantageous characteristics, such as nonnecessity of carrier recovery circuits, fast acquisition performance, phase ambiguity resolution, and good performance over multipath fading channels. In BLUETOOTH systems and DECT systems higher data rate options exist that use packets that may be partly DPSK and partly CPM modulated. The information in MDPSK data packets and CPM data packets is contained in the phase changes over the symbol intervals.

A device receiving data packets then demodulates the incoming data packets via a demodulator. The demodulator removes the modulation from the incoming data packets which are then processed by other portions of the device to form signals that may be output to the user, for example, via a speaker (in the case of audio signals) or a display (in the case of video or other signals).

In M-ary PSK techniques, the information is embedded in the phase. For example, a 4-ary PSK modulation, also called QPSK, uses 4 constellation points which are positioned on a 90-degrees reference as shown in FIG. 1. Since the transmitter can choose between 4 symbols (each symbol corresponds to a constellation point), the transmitter transmits 2 bits per symbol. More complex PSK modulation formats exist with 8 points (3 bits/symbol) and more. In general, M-ary PSK signals can be represented as a complex vector with an amplitude A and a phase θ.

$$x(t) = A(t) \cdot e^{j\theta(t)} \quad i=1,2,3 \quad (1)$$

$$\theta(t) = \frac{2\pi}{M} \sum_{i \leq n} \beta_i \quad nT < t \leq (n+1)T \quad (2)$$

Here T is the symbol time. The phase change of the M-ary PSK signal over a one symbol period interval T is equal to $$\frac{2\pi}{M} \beta_i$$

when the noise and ISI (Inter Symbol Interference) terms are neglected. Here $\beta_i$ is the $i^{th}$ transmitted data symbol with $\beta_i \in \{0, 1, 3, (M-1)\}$. For M=4, which corresponds to QPSK, four phases at 0, π/2, π, and −π/2 result.

In a differential encoded technique, the information is not embedded in the symbol position itself, but in the difference between two consecutive symbols. For example, in FIG. 1, if the transmitter wants to send information bits 00, the following symbol will be the same as the previous symbol. If the transmitter wants to send bits 01, the next symbol is rotated π/2 radians compared to the previous signal. If the transmitter wants to send bits 10, the next symbol is rotated π radians compared to the previous signal, and finally if the transmitter wants to send bits 11, the next symbol is −π/2 radians away from the previous symbol. The new symbol is based on the previous symbol, irrespective the absolute position of the previous symbol. As such, consecutive symbols S0, S0, contain the same information (namely information bits 00) as consecutive symbols S1, S1.

Differential PSK can be demodulated in two ways, namely coherently or non-coherently. A coherent receiver recovers the phase and the frequency. In other words, the coherent receiver creates a reference axis for the constellation points. For a QPSK modulation, the constellation as shown in FIG. 1 is recreated in the receiver and is fixed. A received symbol is compared with each constellation point Sx. According to the maximum likelihood theorem, the constellation point that is closest to the received symbol is determined. If differential PSK is applied, the current decision is compared with the previous decision in order to derive the received information. Differential encoding does not require that the receiver recover the absolute phase. As long as the symbols coincide with the reference axis, differential decoding can be accomplished. For FIG. 1, the constellation may be as shown or, because the reference is stable, the constellation may be rotated by 90 degrees, 180 degrees, or 270 degrees. In addition, differential encoding permits small frequency errors. When the frequency cannot be predicted accurately, then a frequency offset is present. A frequency offset translates into a slow but continuous rotation of the constellation reference. If this rotation drift is small compared with the minimum phase rotation between adjacent symbols (i.e., 90 degrees of QPSK), a differential decoding scheme will show little performance degradation in the presence of frequency drift.

The second way of demodulating differentially encoded PSK signals is by non-coherent detection. In this case, the receiver uses the previously received symbol as reference for the next symbol. As such, in non-coherent detection, no constellation reference is established. The reference in the coherent receiver is a clean reference stripped of any noise of importance, whereas the reference in the non-coherent receiver includes the noisy received previous symbol. Therefore, non-coherent detection has inferior noise performance when compared to coherent detection. Yet, non-coherent receivers are more simple to implement and can handle larger frequency offsets.

Semi-coherent detectors combine the features of the non-coherent and coherent detectors. In semi-coherent detectors, the constellation reference is updated continuously based on the received symbols. If only the previous symbol is applied for the update, a non-coherent receiver results. If all previous symbols are applied for the update, a coherent receiver results. A semi-coherent receiver results if previous symbols are weighted while updating the constellation reference. Generally, more recent symbols are emphasized more than older symbols. A coherency parameter $\lambda$ is defined which is a measure of coherency. For $\lambda=0$, only the last received symbol is used and a non-coherent detector results. For $\lambda=1$, all previous symbols are used and a coherent receiver results. A $\lambda$ smaller than 1 but larger than 0 provides a semi-coherent receiver where most recent symbols have a larger impact on the update of the constellation reference than older symbols. The semi-coherent demodulator approximates the performance of a coherent demodulator without requiring carrier phase acquisition and tracking.

Referring now to FIG. 2, a known semi-coherent demodulator 100 for demodulating M-ary Differential PSK (MDPSK) signals is illustrated. In the FIGURES, a bold arrow indicates a complex signal and a thin arrow indicates a real signal. The semi-coherent demodulator 100 includes a frequency tracking section 310 and a detection section 320 as shown in greater detail in FIG. 3. The frequency tracking section 310 and the detection section 320 may be interconnected via a decision signal $\phi_i^{100}$ and a reference phase signal $\psi_i^{100}$.

An input signal $x_i$ is received in complex format by the semi-coherent demodulator 100. The semi-coherent demodulator 100 manipulates the input signal $x_i$ into amplitude $A_i^{100}$ and phase $\theta_i^{100}$ components (conversion into polar format) via a magnitude calculator 104 and a phase calculator 106, respectively, according to the following equation:

$$x_i = A_i^{100} e^{j\theta_i^{100}} \quad i=1,2,3 \tag{3}$$

The amplitude $A_i^{100}$ and phase $\theta_i^{100}$ are subsequently used in the frequency tracking section 310 and the detection section 320. The frequency tracking section 310 is illustrated in greater detail in FIG. 4. In FIG. 4 identical numerals relate to identical components. In FIG. 4, only the components of FIG. 2 related to the frequency tracking section 310 are shown. The frequency tracking section 310 creates the constellation reference in order to apply the semi-coherent detection. First, the effect of the modulation is removed in phase adder 112. In the phase adder 112, $\phi_i^{100}$ (which is an estimate of the received phase change and will be described in more detail below) is subtracted from the received phase $\theta_i^{100}$. As a result, a phase $\xi_i^{100}$ remains which is independent of the modulation and can be used to build the reference. Basically, phase $\xi_i^{100}$ represents the new estimate of the phase reference $\psi_i^{100}$ which is the output of the frequency tracking section 310. The phase reference $\xi_i^{100}$ and the amplitude $A_i^{100}$ are then used in the polar-to-complex converter 114 to build an input reference vector $u_i^{100}$.

The reference vector $u_i^{100}$ may remain disturbed by impairments such as noise and intersymbol interference (ISI). The impairments may be averaged out by integration at an integrator 108. The integrator 108 operates in the complex domain in order to ensure that the amplitude $A_i^{100}$ of the semi-coherent demodulator 100 is considered. A coherency parameter $\lambda$ is input with the reference vector $u_i^{100}$ to form the output of the integrator 108, a reference vector $r_i^{100}$. Many approaches may be employed to integrate the reference vector $u_i^{100}$. An exponential integration window yields the following equation:

$$r_i^{100} = \lambda \cdot r_{i-1}^{100} + (1-\lambda) \cdot u_i^{100} \quad i=1,2,3 \tag{4}$$

If $\lambda$ approaches 1, $r_i$ is not updated and a coherent detector results. If $\lambda$ approaches 0, the updated reference vector $r_i^{100}$ depends on the current input reference vector $u_i^{100}$ and not on previous reference values, so a non-coherent detector results. With $\lambda$ somewhere between 0 and 1, a semi-coherent detector results. The reference vector $r_i^{100}$ is input to a complex-to-polar converter 116 where only the phase output $\psi_i^{100}$ is used. Summarizing, we see that in the frequency tracking section 310 the phase reference $\psi_i^{100}$ is updated by a current estimate of the phase reference $\xi_i^{100}$. The new input $\xi_i^{100}$ is weighted with previous updates through the procedure carried out in the integrator 108. So the input signal $x_i$ is rotated back to the proper quarter in the constellation diagram where the reference vector is built up, i.e. the rotated vector $u_i^{100}$ updates the reference vector $r_i^{100}$ which in turn provides the updated $\psi_i^{100}$.

As noted above, in order to remove the impact of the modulation, an estimate of the received phase change $\phi_i^{100}$ is used. This value is determined in the detection section 320, shown in more detail in FIG. 5. First, the phase change $\delta_i^{100}$ between the received vector $x_i^{100}$ and the previous reference vector $r_{i-1}^{100}$ is determined. The input phase of $x_i^{100}$ is $\theta_i^{100}$ whereas the reference phase of $r_{-1}^{100}$ is $\psi_{i-1}^{100}$, therefore $\delta_i^{100} = \theta_i^{100} - \psi_{i-1}^{100}$. Note that $\psi_{i-1}^{100}$ is the delayed version of the reference phase $\psi_1^{100}$ which is calculated in the frequency tracking section 310. The delay operation takes place at a unit delay 118 and is a delay of one symbol time T. The phase subtraction is carried out in a phase sum adder 120. The result is a noisy phase difference $\delta_i^{100}$ between the received signal and the reference. In decision unit 110, we map the phase difference to one of the phase differences $\phi_i^{100}$ possible in the constellation diagram. For example, for a QPSK modulation, the phase difference $\delta_i^{100}$ can be mapped on $\delta_i^{100}=0$, $\pi/2$ radians, $-\pi/2$ radians, or $\pi$ radians. The $\phi_i^{100}$ for which the difference $|\phi_i^{100} - \delta_i^{100}|$ is minimal may be selected. Note that the detection in decision unit 110 refers to the phase difference between the received symbol and the reference. $\phi_i^{100}$ can be regarded as a tentative decision for the phase change. $\phi_i^{100}$ is used in the frequency tracking section 310 in order to remove the effect of the modulation as described above.

Continuing with FIG. 5, the final differential detection is carried out in a second unit delay 122 and a phase sum adder 126. Here, the current decided phase $\phi_i^{100}$ is compared with the previous decided phase $\phi_{i-1}^{100}$. The output $y_i^{100}$ is the detected phase difference (i.e. the phase change between the currently received symbol $x_i^{100}$ and the previously received symbol $x_{i-1}^{100}$). A look-up-table 128 is used to map the phase difference to a bit series $B_i^{100}$. For example, for QPSK, the output $y_i^{100}$ can be 0, $\pi/2$ radians, $\pi$ radians, and $-\pi/2$ radians, corresponding to bit sequences $B_i^{100}$ of 00, 01, 10, or 11, respectively.

The operations in the semi-coherent demodulator 100 are further visualized in FIGS. 6a and 6b. In FIG. 6a, a general complex plane (I, Q) is shown by thin dotted lines. This complex plane is needed to define the different phases (as phase is a relative parameter). This plane is determined by the local oscillator in the receiver. A complex vector $x_i^{100}$ is received. This vector has a phase of $\theta_i^{100}$ (with respect the general plane (I, Q)). Also a complex reference vector $r_{i-1}^{100}$ is present. The complex reference vector $r_{i-1}^{100}$ is aligned with the reference plane which is indicated by the thick dashed line, and has a phase of $\psi_{i-1}^{100}$ (again with respect to the general plane (I, Q)). The received phase difference between $x_i^{100}$ and $r_{i-1}^{100}$ is $\delta_i^{100}$ and is derived in the phase sum adder 120. This phase difference $\delta_i^{100}$ is then mapped at one of the possible phase differences $\phi_i^{100}$. The phase $\phi_i^{100}$ is subsequently subtracted from the input phase $\theta_i^{100}$ in a phase sum adder 112 (i.e., the input vector $x_i^{100}$ is rotated to provide the reference input $u_i^{100}$). This aspect is shown in greater detail in FIG. 6b. The input vector $x_i^{100}$ has a phase $\xi_i^{100}$ Generally, this input phase $\xi_i^{100}$ is slightly different from the reference phase $\psi_{i-1}^{100}$ and is used to update the reference phase to $\psi_i^{100}$.

In addition, to the MDPSK modulated signals, the receiver may receive M-ary Continuous Phase Modulation (MCPM) signals. Again, an MCPM signal can be represented by a complex vector as shown in Eqn. (1), but the phase of a MCPM signal is as follows:

$$\phi(t) = 2\pi h \sum_{i \le n} \alpha_i q(t - iT) \quad nT < t \le (n+1)T \quad (5)$$

where q(t) is the phase smoothing function and $\alpha_i$ is the $i^{th}$ transmitted data symbol, with $\alpha_i \in \{\pm 1, \pm 3, \ldots \pm(M-1)\}$ and T is the symbol time. The function q(t) is normalized such that $$\lim_{t \to \infty} q(t) = 0.5.$$

The smoother the function q(t), the narrower the spectrum will be, however a higher amount of inherent ISI will be generated. The frequency response function g(t) is the derivative of the phase smoothing function q(t), so for q(t):

$$q(t) = \int_{\tau=0}^{t} g(\tau) d\tau \quad (6)$$

Partial response MCPM schemes are MCPM schemes in which $g(t) \ne 0$ for $t > T$. The phase change over a one-symbol period in a partial response MCPM scheme depends on multiple subsequent transmitted symbols $\alpha$. Due to this phenomenon, partial response MCPM schemes generate inherent ISI. Currently, the inherent ISI requires maximum likelihood sequence estimation (MLSE) receivers if optimum reception is desired.

Although the overall phase change is built up from several contributions, in many cases the overall phase change is dominated by one term. In these cases, non-coherent receivers, such as a semi-coherent demodulator as described before, may be employed. Therefore, there is a need for a pre-processor capable of receiving MCPM signals and processing the MCPM signals for delivery to a MDPSK demodulator.

SUMMARY OF THE INVENTION

Embodiments of the present invention provide a pre-processor for a phase domain MDPSK demodulator. The pre-processor includes a phase multiplier for multiplying a MCPM signal by a scaling factor and a frequency shifter for shifting the scaled MCPM signal to create a frequency offset. The pre-processing allows a MDPSK demodulator to demodulate the received MCPM signal.

In another aspect, the present invention relates to method for pre-processing a M-ary Continuous Phase Modulation (MCPM) signal. The method includes the steps of receiving a MCPM signal, extracting a phase component of the received MCPM signal, multiplying the phase component of the received MCPM signal by a scaling factor, and shifting a frequency of the phase-multiplied MCPM signal.

In another aspect, the present invention relates to an article of manufacture for demodulation of an input signal. The article of manufacture includes at least one computer readable medium, and processor instructions contained on the at least one computer readable medium. The processor instructions are configured to be readable from the at least one computer readable medium by at least one processor and thereby cause the at least one processor to operate as to receive a M-ary Continuous Phase Modulation (MCPM) signal at a device, extract a phase component of the received MCPM signal, multiply the phase component of the received MCPM signal, and shift a frequency of the phase multiplied MCPM signal. The article of manufacture also includes a demodulator for demodulating the scaled and shifted phase component of the received MCPM signal.

In another aspect, the present invention relates to a receiver for demodulating received M-ary Continuous Phase Modulation (MCPM) signals. The receiver includes a pre-processor for transforming a modulation format of a received MCPM signal to a modulation format of a MDPSK signal, and a M-ary Differential encoded Phase Shift Keying (MDPSK) demodulator for demodulating the transformed MCPM signal.

BRIEF DESCRIPTION OF THE DRAWINGS

Further advantages and specific details of the present invention will become apparent hereinafter from the detailed description given below in conjunction with the following drawings.

DETAILED DESCRIPTION OF THE
EXEMPLARY EMBODIMENTS OF THE
INVENTION

Semi-coherent demodulators generally use the amplitude information of the input signal $x_i$ to perform calculations. However, when using MDPSK modulation, the information is merely embedded in the phase and not in the amplitude. Semi-coherent demodulators for demodulating MDPSK can therefore be simplified when the amplitude information can be disregarded. It should be understood that various symbols used in the Detailed Description may relate to a signal itself or to a signal used to transmit an angle or other value.

Figure 1:
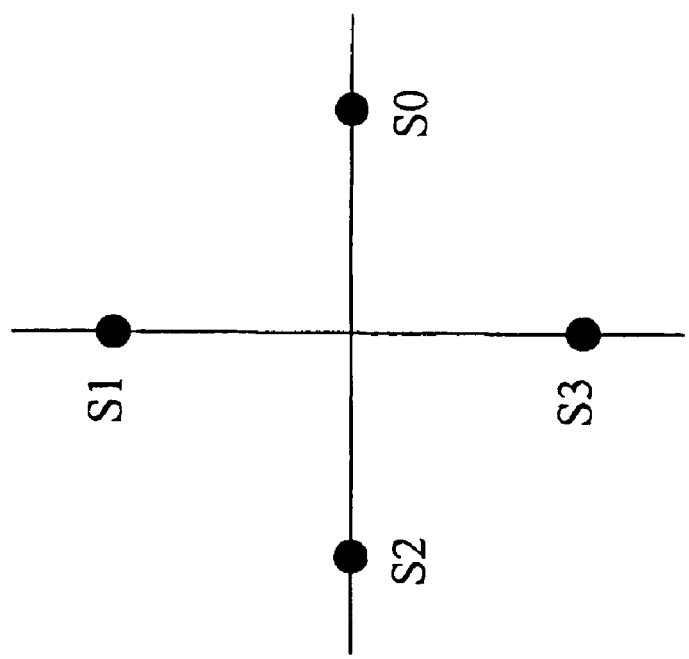
FIG. 1 is a diagram of a constellation reference in the complex IQ plane.
Figure 2:
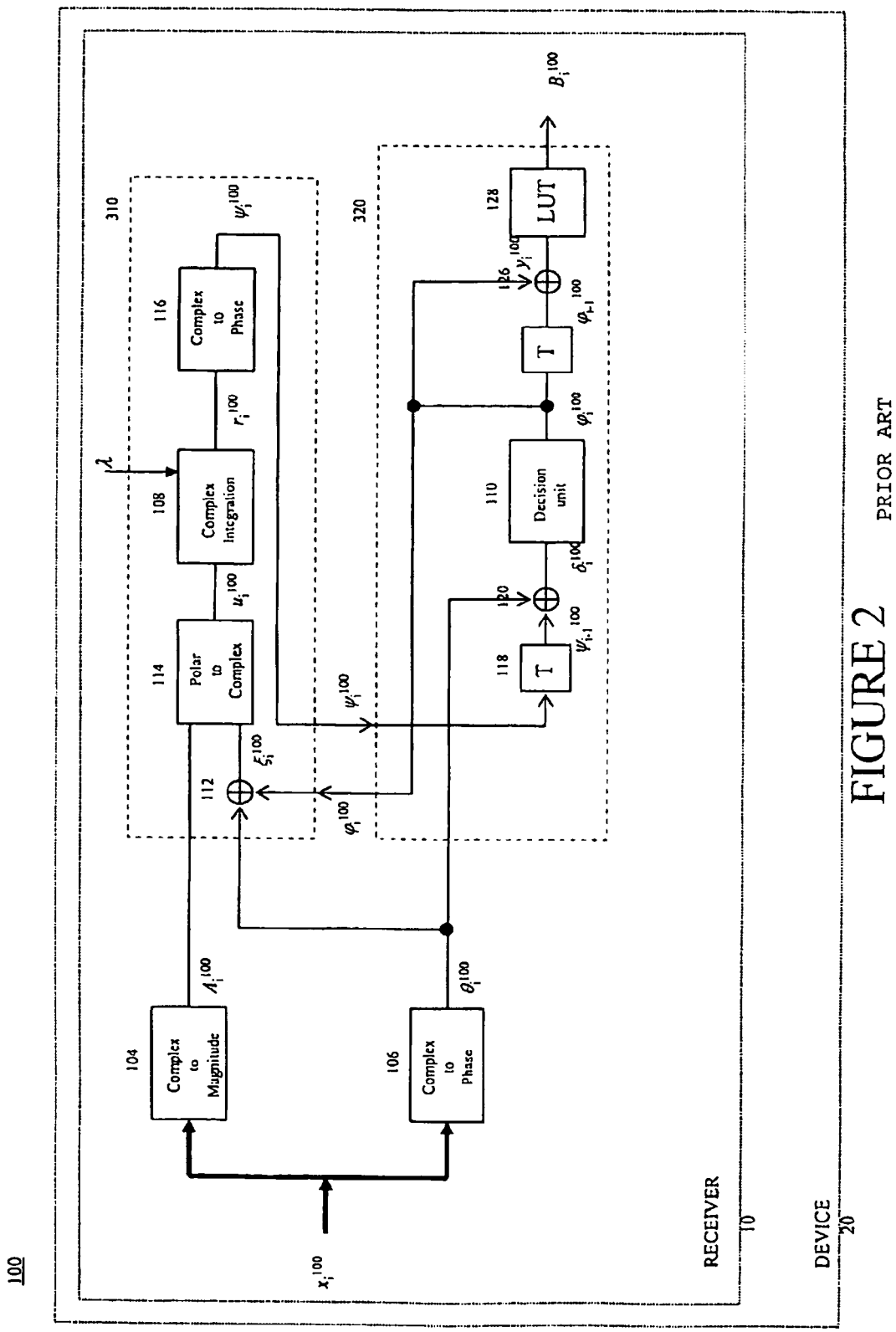
FIG. 2, previously described in part, is a block diagram that schematically illustrates a known MDPSK semi-coherent demodulator.

A demodulator, utilized in conjunction with embodiments of the present invention, may be implemented in hardware, such as an Application-Specific Integrated Circuit (ASIC), or in software. The software may run on a Digital Signal Processor (DSP) or other processor. The implementation of the semi-coherent demodulator may depend on design choices and/or constraints of a manufacturer or communication product. The semi-coherent demodulator, as shown in FIG. 2, requires various phase-to-complex and complex-to-phase conversions to be performed, thereby increasing complexity. The semi-coherent demodulator 100 may be implemented in a receiver portion 10 of a wireless communication device 20.

Various embodiments of the present invention relate to a pre-processor for transforming MCPM signals to appear as MDPSK signals prior to transmitting the signals to an MDPSK demodulator. By transforming the MCPM signals, a single MDPSK demodulator may be used to demodulate both the received MDPSK and MCPM signals.

Figure 7:
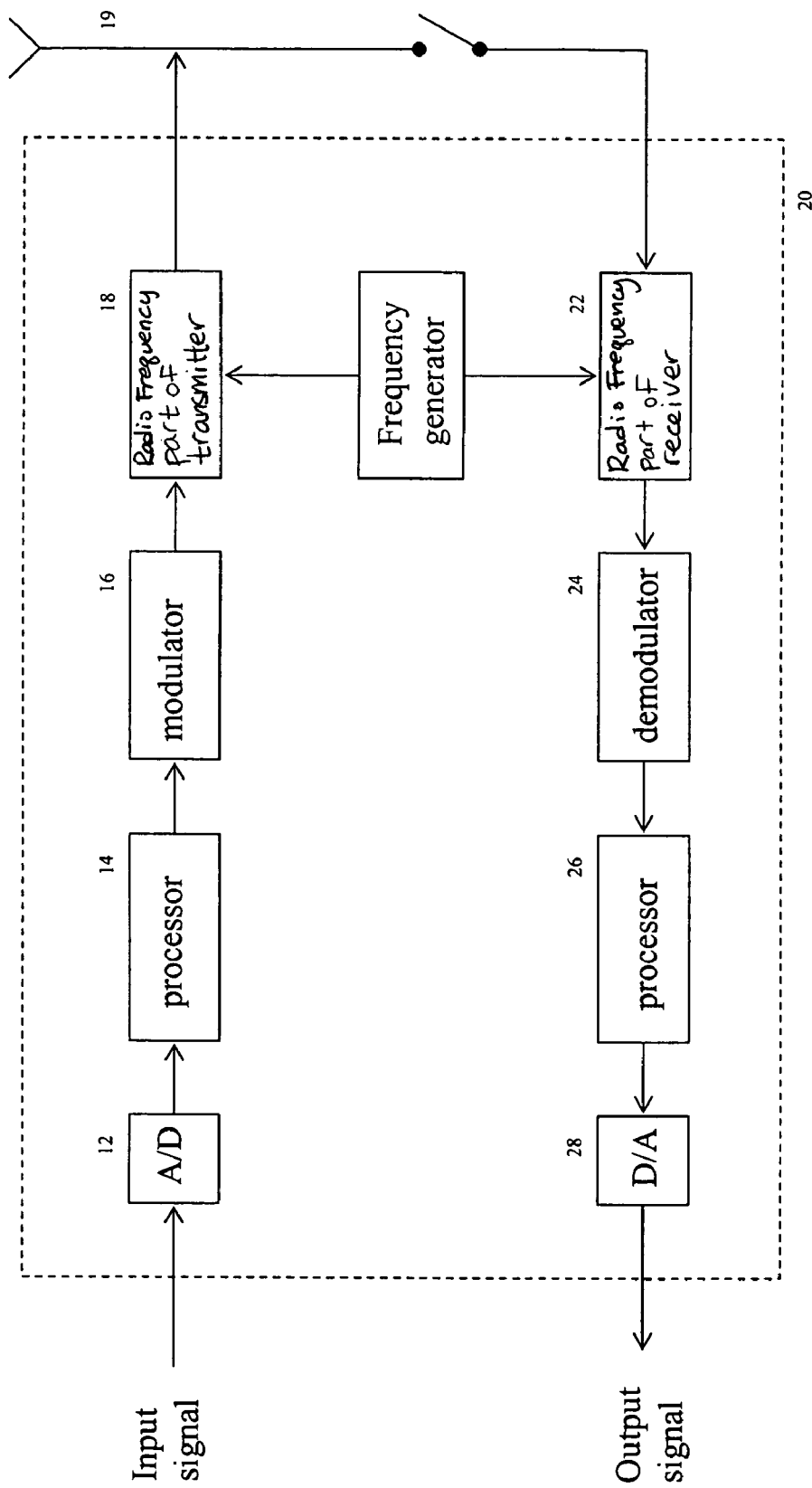
FIG. 7 is a block diagram of a wireless device that may be utilized in conjunction with a pre-processor of an embodiment of the present invention.

Referring now to FIG. 7, a wireless device 20, operating in a wireless communication system, is illustrated. The wireless device receives input signals (i.e., speech from a microphone, data from a keypad, etc.) that are converted from an analog signal to a digital signal at an A/D converter 12. The digital signal is processed by one or more processing units 14 for encoding, interleaving, etc. The processed signal is modulated at a modulator 16 and sent via a radio transmitter 18 to an antenna 19. The radio transmitter 18 upconverts the processed signal to RF frequency, amplifies and filters the RF signal. A receiver 22 receives incoming signals for the wireless device 20 and filters out unwanted signals, amplifies, and downconverts the signal to baseband. The signal is then transmitted to a demodulator 24 for subsequent demodulation. An exemplary demodulator that may be utilized in conjunction with the present invention may is shown in greater detail in FIGS. 8-13. The demodulated signal is passed through one or more processing units 26 for decoding, de-interleaving etc. The processed signal is converted from a digital to an analog signal at a D/A converter 28 and relayed to the user via a display or loudspeaker.

The wireless device 20 may receive various types of signals such as a MDPSK and/or a MCPM signal. As an MDPSK signal is demodulated differently than a MCPM signal, either a separate demodulator (an MDPSK demodulator and a MCPM demodulator) is utilized to demodulate each type of signal or, in accordance with an embodiment of the present invention, a pre-processor may be utilized to transform the received MCPM signal into a signal that may be demodulated by a MDPSK demodulator.

As mentioned before, for demodulating MDPSK signals, the semi-coherent demodulator takes into account the phase of the received signal. Therefore, the general schematic as was shown in FIG. 3 may be replaced, in accordance with an embodiment of the present invention, by the simpler schematic shown in FIG. 8. The frequency tracking section 710 of FIG. 8 has one input $\theta_i^{100}$.

Figure 6:
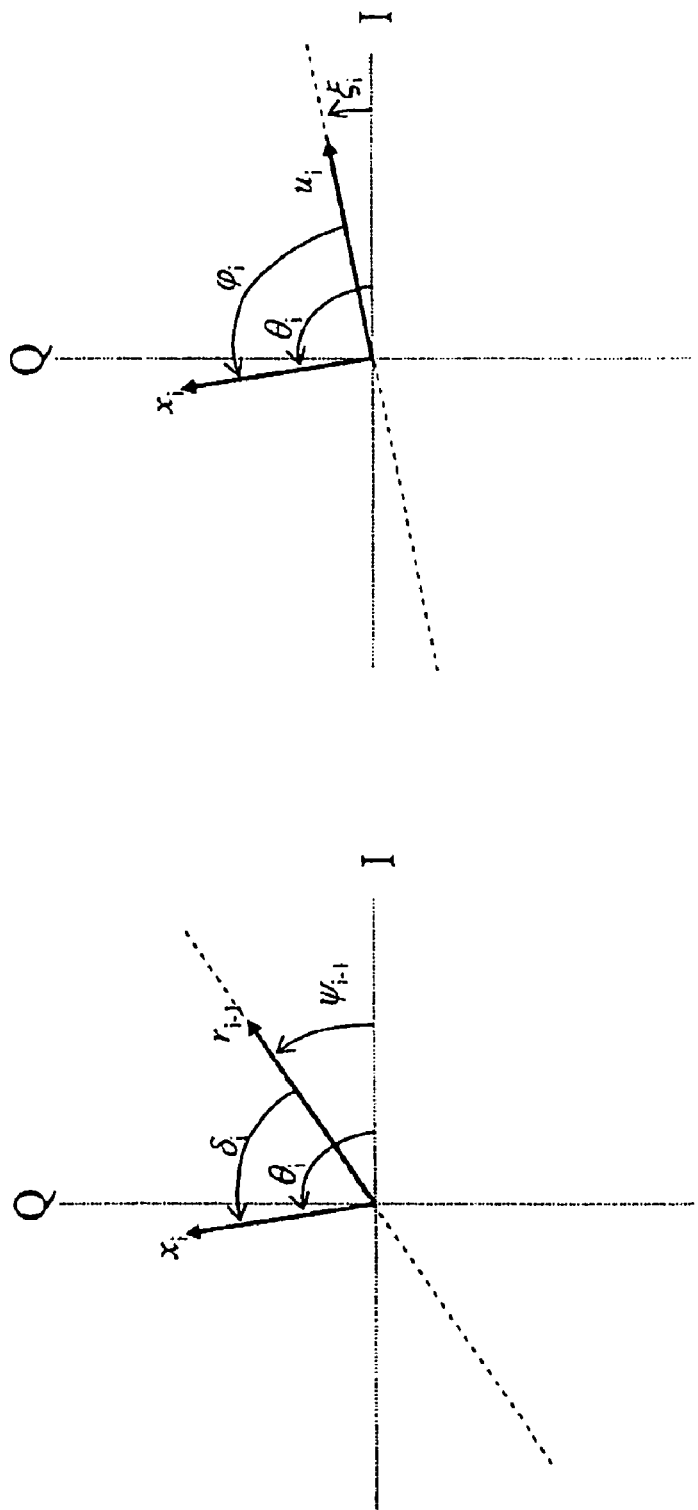
FIG. 6a, previously described in part, is a phase diagram illustrating complex signals associated with FIG. 2.
FIG. 6b, previously described in part, is a phase diagram illustrating complex signals associated with FIG. 2.

Referring back to FIGS. 6a and 6b, in accordance with an embodiment of the present invention, the reference vector $r_{i-1}$ of FIG. 6a, which had a phase $\psi_i^{100}$, can be rewritten as $r_i = e^{j\psi_{i-1}}$. The reference vector $r_{i-1}$ is assumed to be a unity vector (i.e., its amplitude is 1). Previously, with the newly arrived symbol $x_i$, a new estimate vector $u_i$ of the reference vector was generated. The vector $u_i$ had a phase $\xi_i$. In accordance with an embodiment of invention, the amplitude information in $x_i$ may be disregarded. Therefore, $u_i$ becomes a unity vector and can be written as $u_i = e^{j\xi_i}$. Now $r_{i-1}$ and $u_i$ may be used to derive $\psi_i^{200}$ with the new frequency tracking section 710 in accordance with an embodiment of the present invention.

Reusing Eqn. (4) in the phase domain yields the following equations for $\psi_i^{200}$:

$$\psi_i^{200} = \arg(r_i) \tag{7}$$
$$\psi_i^{200} = \arg(\lambda \cdot e^{j\psi_{i-1}} + (1-\lambda) \cdot e^{j\xi_i})$$
$$\psi_i^{200} = \arg(e^{j\psi_{i-1}} \cdot (\lambda + (1-\lambda) \cdot e^{j(\xi_i - \psi_{i-1})}))$$
$$\psi_i^{200} = \psi_{i-1}^{200} + \arg(\lambda + (1-\lambda) \cdot e^{j(\xi_i - \psi_{i-1})})$$
$$\psi_i^{200} = \psi_i^{200} + \vartheta_i^{200}$$

where the function arg(x) refers to taking the argument (phase) of the complex signal x. Eqn. (7) shows that the reference phase $\psi_i^{200}$ at instant i may be obtained by adding an update value $\theta_i^{200}$ to the delayed reference phase $\psi_{i-1}^{200}$ without the need for calculations in the complex domain.

The update value $\theta_i^{200}$ is given by:

$$\vartheta_i^{200} = \arg(\lambda + (1-\lambda) \cdot e^{j(\xi_i - \psi_{i-1})}) \tag{8}$$
$$\vartheta_i^{200} = \arctan\left(\frac{(1-\lambda) \cdot \sin(\zeta_i)}{\lambda + (1-\lambda) \cdot \cos(\zeta_i)}\right)$$

where $\zeta_i$ is the phase difference $\xi_i - \psi_{i-1}$ which is the phase difference between $u_i^{100}$ and $r_{i-1}^{100}$. The update value $\theta_i^{200}$ is a zero-mean stochastic variable that is bounded to the ranges $[-\pi/2, \pi/2]$, $[-\pi/4, \pi/4]$, and $[-\pi/8, \pi/8]$ for M=2, 4, and 8, respectively. The update value $\theta_i^{200}$ may be relatively small, thereby allowing a simplification in the calculation. For small values of $\theta_i^{200}$, the update value can be evaluated by its Taylor series expansion:

$$\theta_i^{200} = c_1 \cdot \zeta_i^{200} + c_2 \cdot (\zeta_i^{200})^2 + c_3 \cdot (\zeta_i^{200})^3 + \tag{9}$$

with the coefficients (derived from Equation 8):

$$c_1 = 1 - \lambda$$
$$c_2 = \frac{1}{6}\lambda - \frac{1}{2}\lambda^2 + \frac{1}{3}\lambda^3$$
$$c_3 = -\frac{1}{120}\lambda + \frac{1}{8}\lambda^2 - \frac{5}{12}\lambda^3 + \frac{1}{2}\lambda^4 - \frac{1}{5}\lambda^5$$

$\theta_i^{200}$ may be approximated by the first three terms of the series expansion shown in Eqn. (8). A coherency parameter π, as shown in Eqn. (9), is determined for a particular system associated with a phase domain semi-coherent demodulator 200 as shown in more detail in FIG. 10.

Figure 9A:
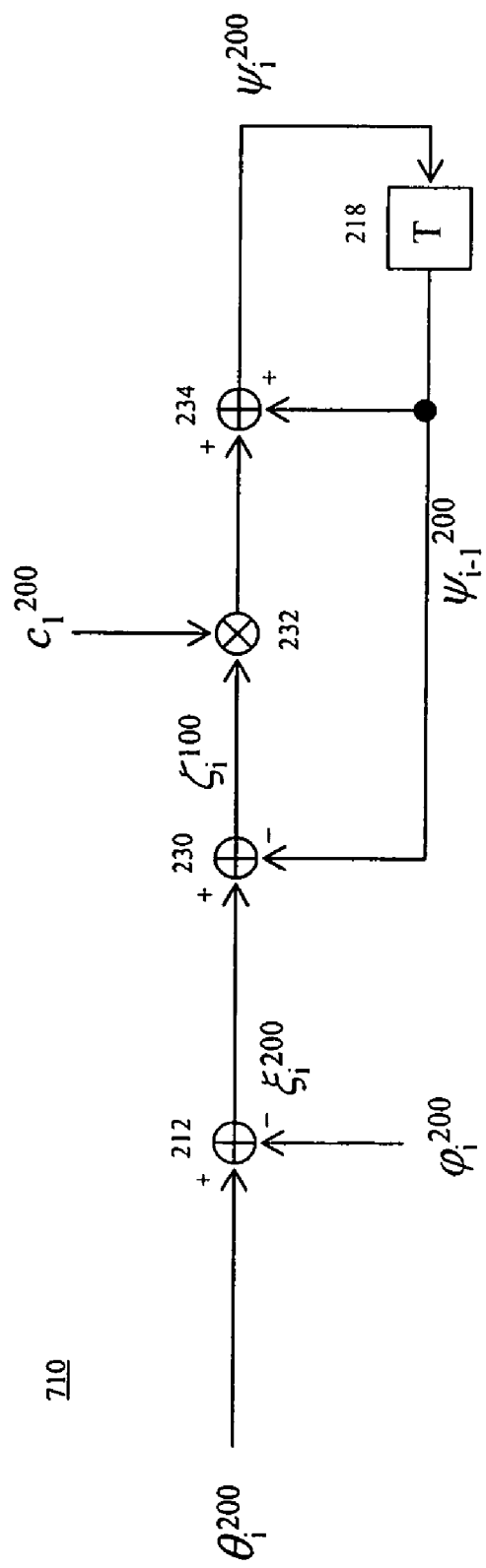
FIG. 9a is a schematic diagram of the frequency tracking section of the demodulator that may be utilized in conjunction with an embodiment of the present invention.

To further simplify the phase-domain semi-coherent demodulator 200, the Taylor series shown in Eqn. (8) with coefficients $c_k$, k=1,2,3, . . . may be reduced to a first-order equation. Then a simplified frequency tracking section 710 results as shown in FIG. 9a. The first-order approximation allows a scaler 232 to be utilized to scale the instantaneous error signal $\zeta_i^{200}$ by the coefficient $c_1$. The output of the scaler 232 is the update value $\theta_i^{200}$ as described by Eqn. (7). A phase sum adder 234 adds the update value $\theta_i^{200}$ to the delayed reference phase $\psi_{i-1}^{200}$ in order to output the reference phase $\psi_i^{200}$.

If the implementation of scaling is simple compared to phase addition, another addition may be removed at the cost of an additional scaling operation. This may be seen by the following equation:

$$\psi_i^{200} = c_1 \cdot \zeta_i^{200} + \psi_{i-1}^{200} = c_1(\xi_i^{200} - \psi_{i-1}^{200}) + \psi_{i-1}^{200} = c_1 \cdot \xi_i^{200} + (1-c_1) \cdot \psi_{i-1}^{200} \quad (10)$$

Figure 9B:
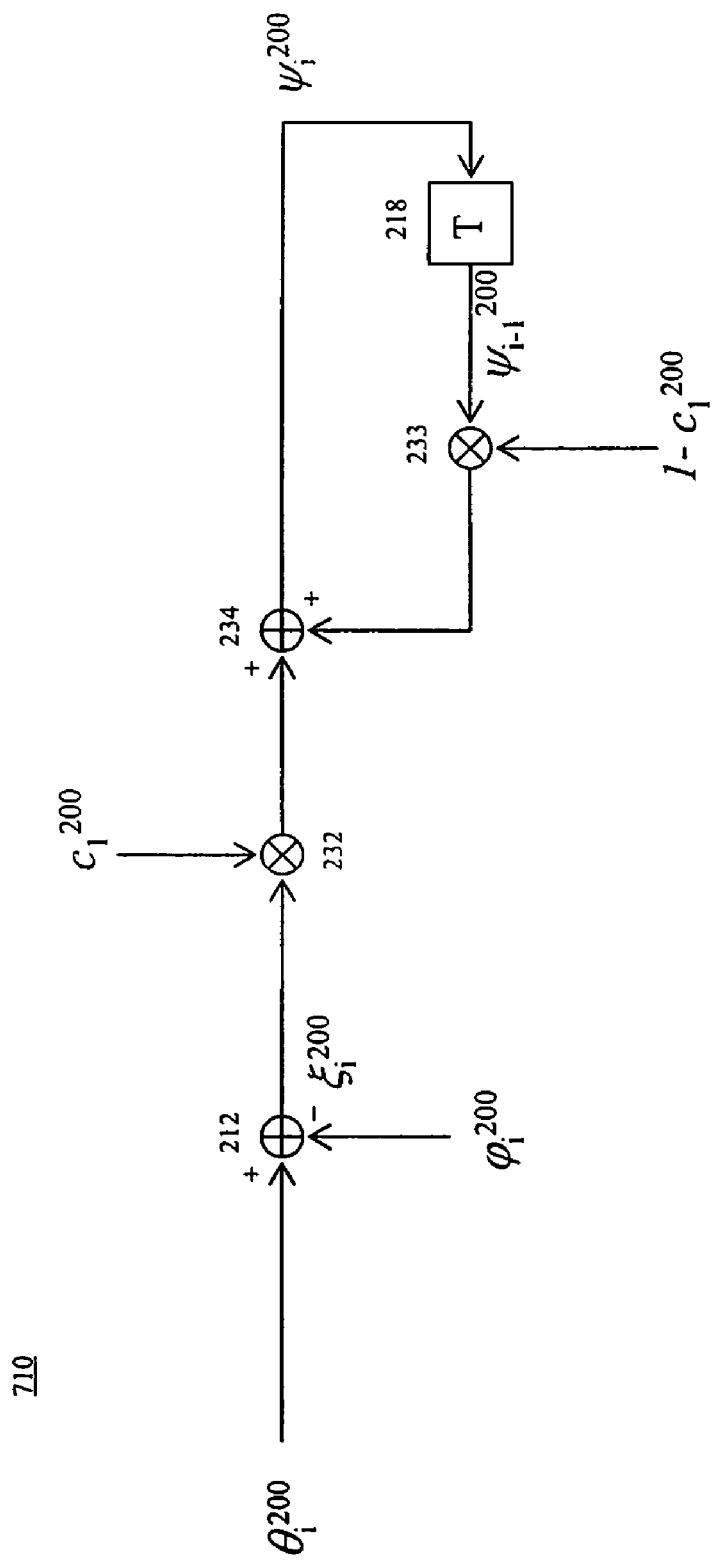
FIG. 9b is a schematic diagram of another embodiment of the frequency tracking section of the demodulator that may be utilized in conjunction with an embodiment of the present invention.

The implementation of this function is shown in FIG. 9b. As shown, adder 230 is removed, but an additional scaling operation at 233 is utilized.

Figure 3:
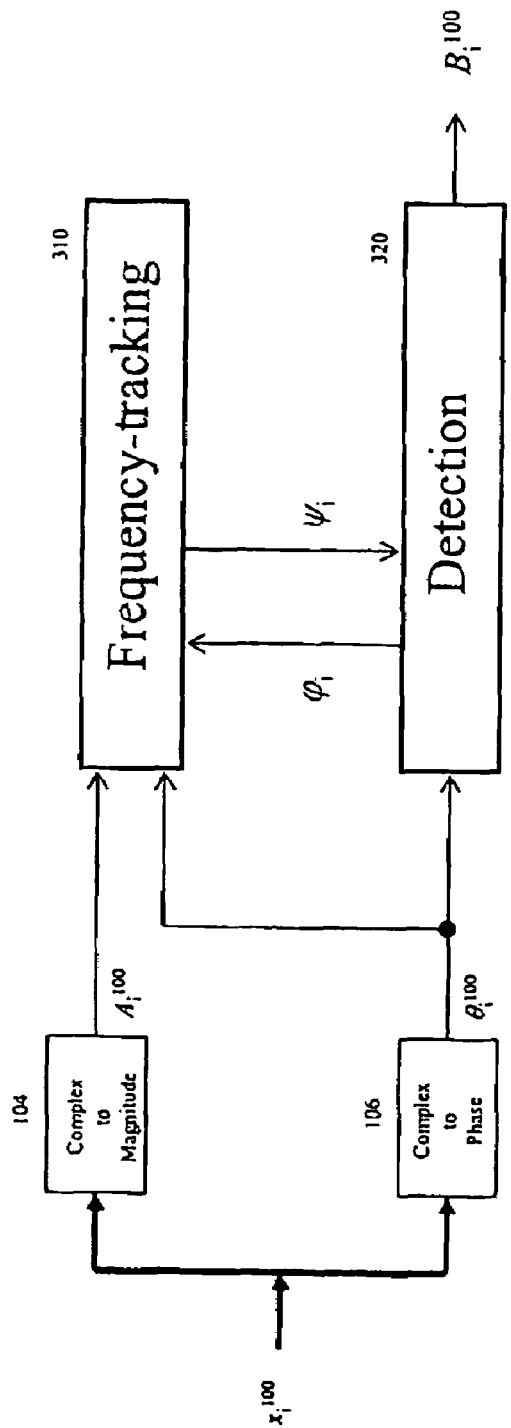
FIG. 3, previously described in part, is a block diagram of a demodulator including a frequency tracking section and a detection section.
Figure 4:
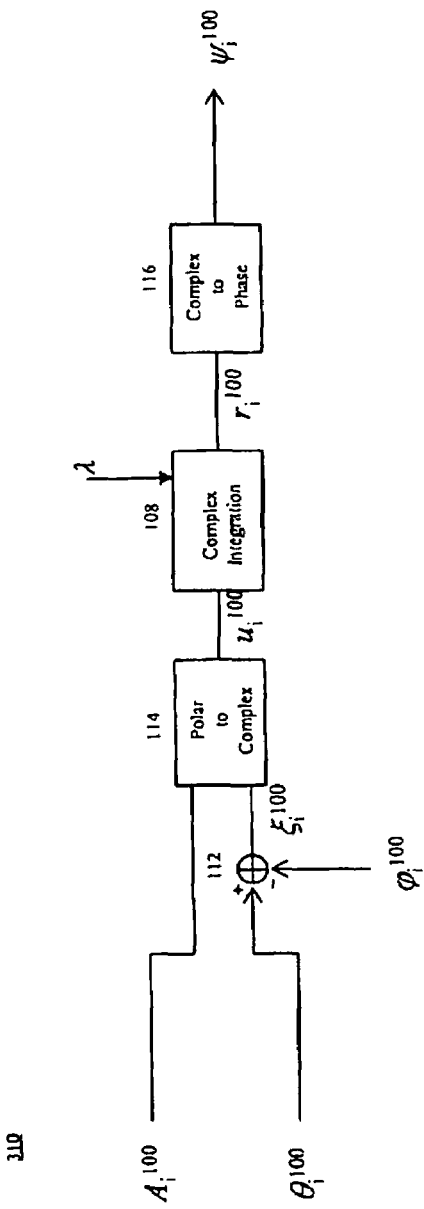
FIG. 4, previously described in part, is a block diagram illustrating the frequency tracking section of FIG. 2 in greater detail.
Figure 5:
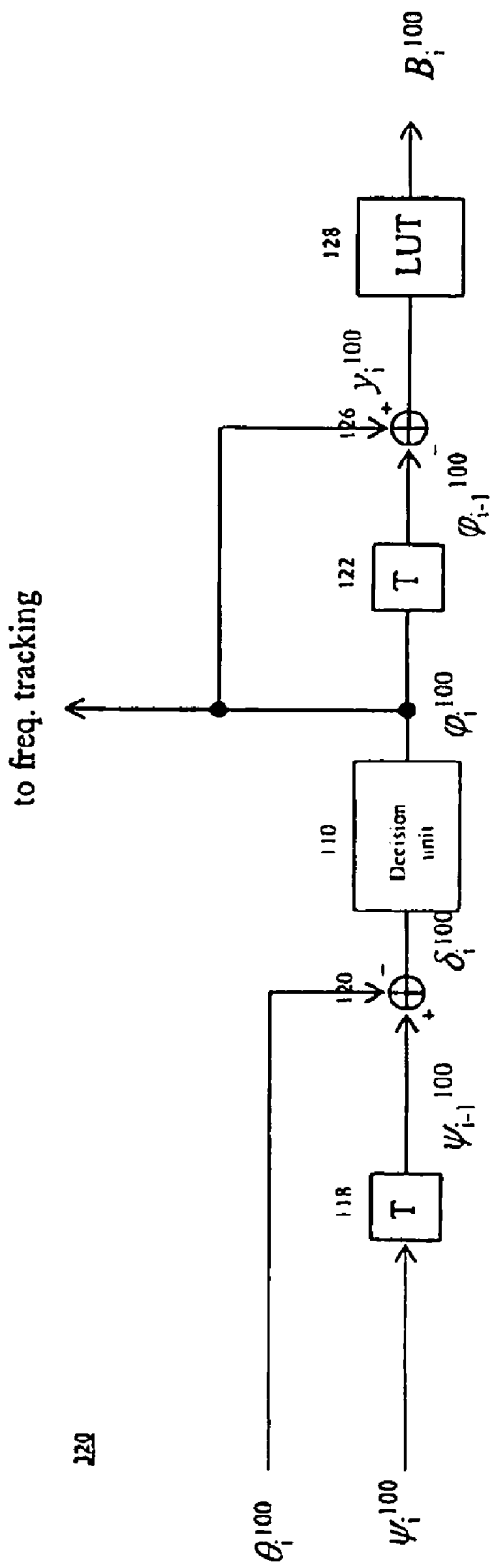
FIG. 5, previously described in part, is a block diagram illustrating the detection section of FIG. 2 in greater detail.
Figure 8:
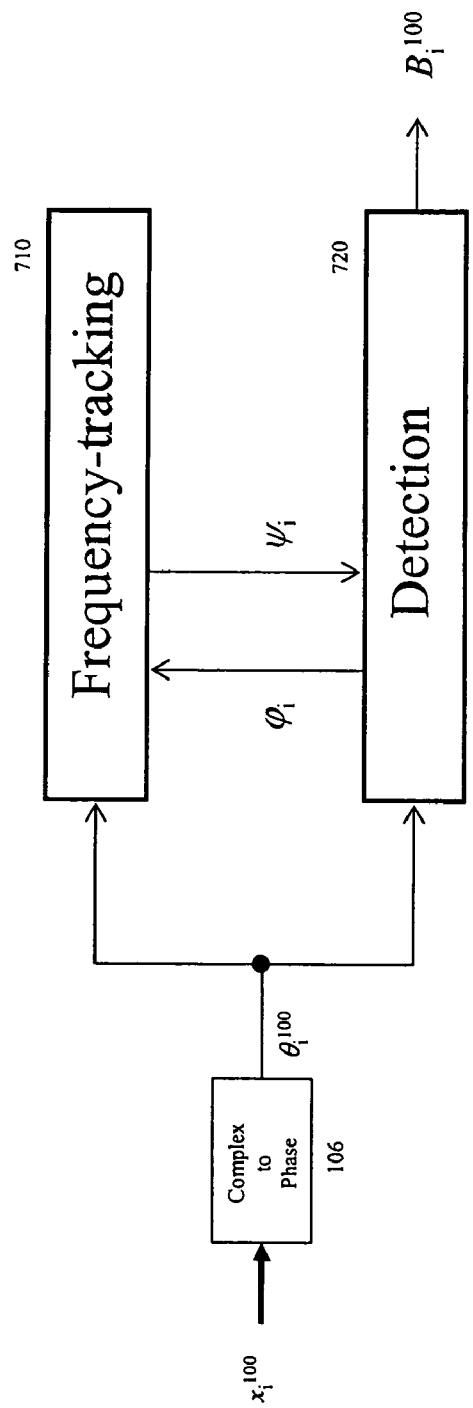
FIG. 8 is a block diagram of a phase domain semi-coherent demodulator that may be utilized in conjunction with an embodiment of the present invention.

The detection section 720 in FIG. 8 may be identical as the detection section 320 shown in FIG. 3. Note that the reference phase $\psi_i^{200}$ is delayed by one symbol time T to $\psi_{i-1}^{200}$ at a unit delay 118. Since the frequency tracking section 710 also had a delay 218 of one symbol time T, delays 118 and 218 may be the same component.

Figure 10:
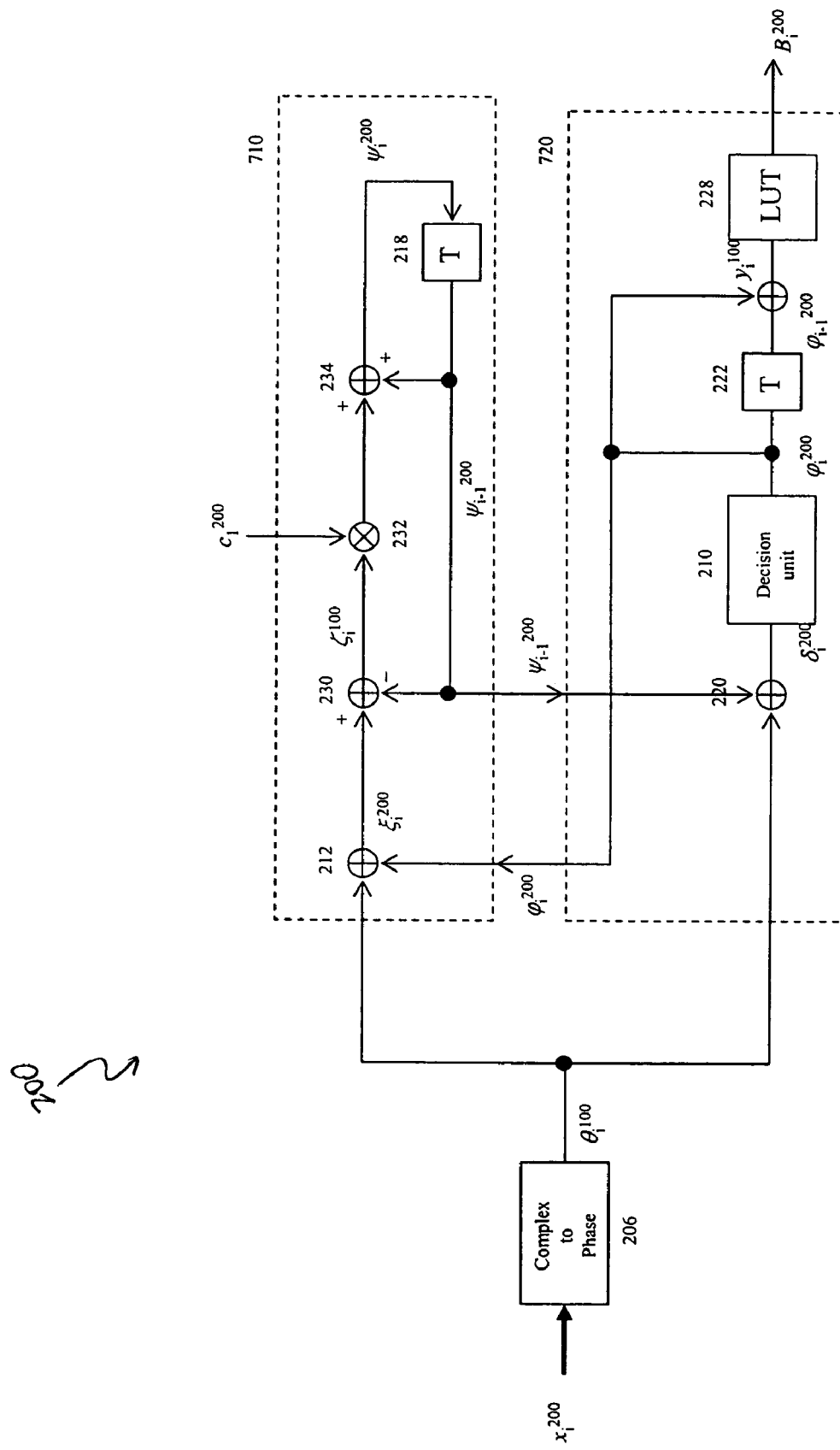
FIG. 10 is a block diagram of a phase domain semi-coherent demodulator that may be utilized in conjunction with an embodiment of the present invention.

FIG. 10 illustrates a complete phase domain semi-coherent demodulator 200 that may be utilized in conjunction with embodiments of the present invention. As shown, the semi-coherent demodulator 200 includes the frequency tracking section 710 and the detection section 720 as described above.

Figure 11:
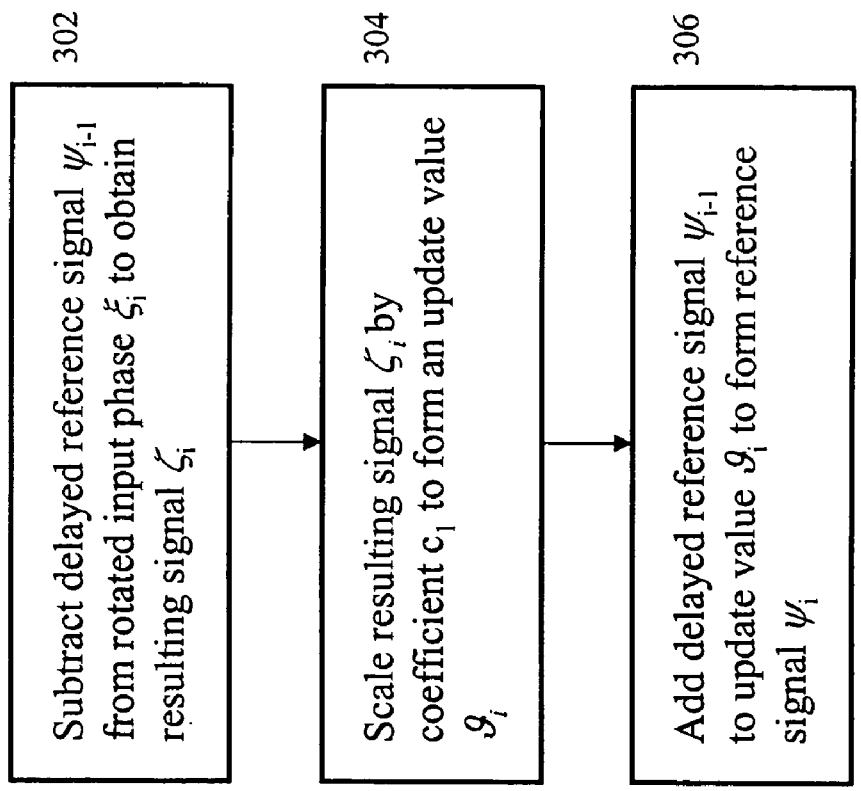
FIG. 11 is a flow diagram of a method of calculating the reference phase in the phase domain.

FIG. 11 is a flow diagram illustrating a method 300 of calculating the reference phase $\psi_i^{200}$ in the phase domain. The flow 300 begins at step 302. At step 302, the delayed reference signal $\psi_i^{200}$ is subtracted from the rotated input phase $\xi_i^{200}$ to obtain the instantaneous error signal $\zeta_i^{200}$. The instantaneous error signal $\zeta_i^{200}$ is scaled by the coefficient $c_1$ to form the update value $\theta_i^{200}$ at step 304. At step 306, the update value $\theta_i^{200}$ is added to the delayed reference signal $\psi^{i-1200}$ to form the reference phase $\psi_i^{200}$. The reference signal $\psi_i^{200}$ may be utilized in various calculations and decisions in order to attain the output $y_i^{200}$ of the phase domain semi-coherent demodulator 200 and to produce the decision of the output $D(y_i^{200})$ as noted above.

Although in the description above one scaler 232 to scale the instantaneous error signal $\zeta_i^{200}$ has been shown, various additional scalers may be employed in this invention to form higher-order approximations to yield better results. However, to obtain more accurate results, there is by necessity a trade off in increased complexity.

Figure 12:
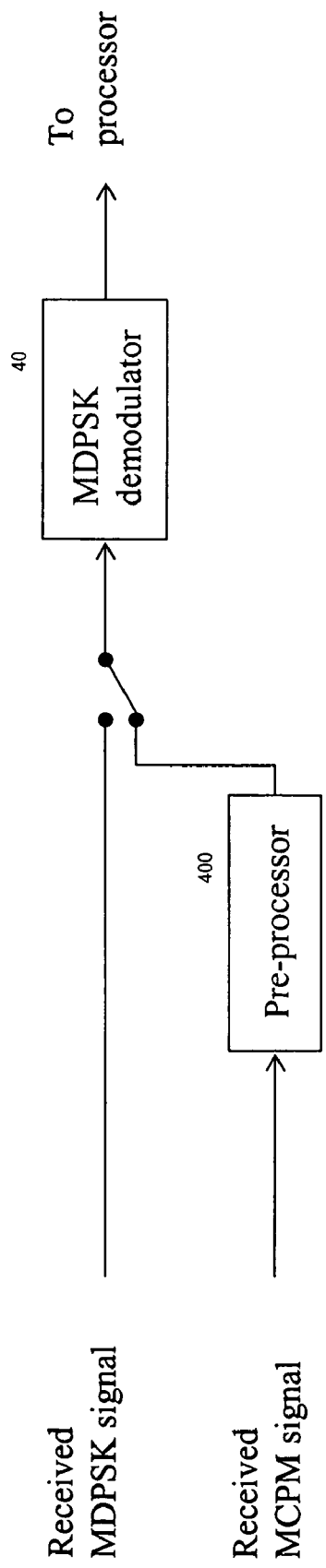
FIG. 12 is a block diagram of a demodulator using a pre-processor in accordance with an embodiment of the present invention.

Referring now to FIG. 12, a combined MDPSK/MCPM demodulator comprising a MDPSK demodulator 40 and pre-processor 400 is shown in accordance with an embodiment of the present invention. When the wireless device 20 receives a MDPSK signal, the MDPSK signal may be transmitted directly from the receiver 22 to the MDPSK demodulator 40 for subsequent demodulation. When the wireless device 20 receives a MCPM signal, the MCPM signal is processed at a pre-processor 400 prior to delivery to the MDPSK demodulator 40. The MDPSK demodulator 40 receives the processed MCPM signal and demodulates the processed MCPM signal in the same manner as a MDPSK signal.

Figure 13:
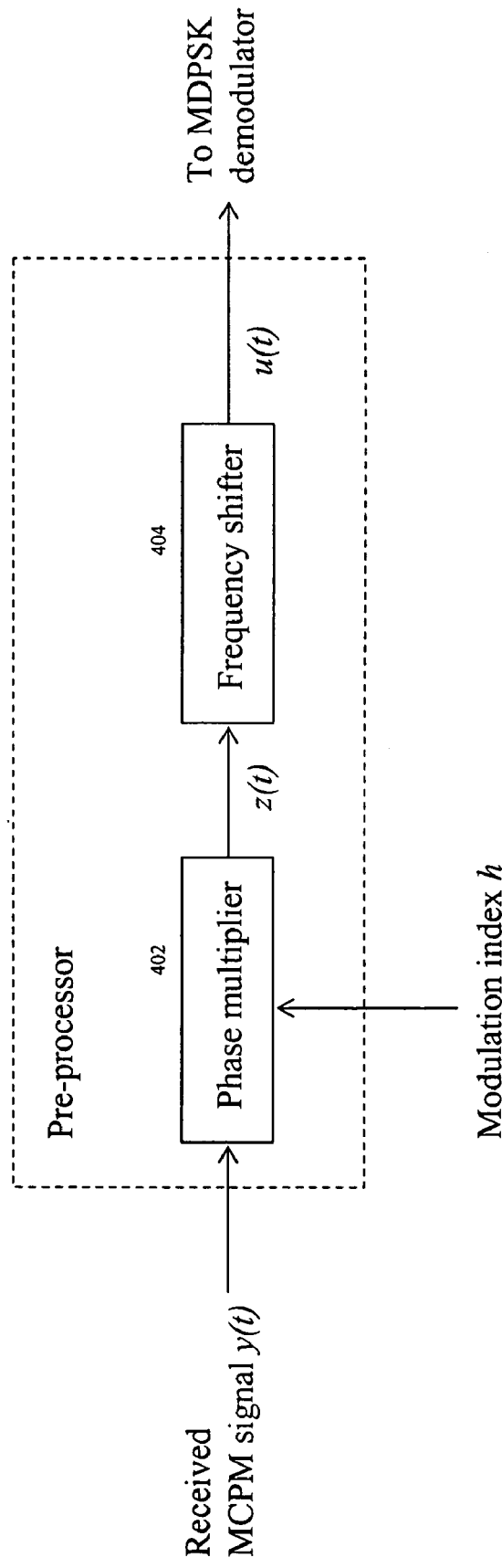
FIG. 13 is a block diagram of a pre-processor in accordance with an embodiment of the present invention.

Referring now to FIG. 13, a detailed block diagram of the pre-processor 400 of FIG. 12 is shown. As set forth above, a modulated signal received at either a MDPSK or MCPM receiver may be represented in complex notation as follows:

$$y(t) = a(t)e^{j\phi(t)} \quad (11)$$

where a(t) is the amplitude, φ(t) is the phase of the signal, and a phase for an MDPSK signal given by:

$$\phi(t) = \frac{2\pi}{M} \sum_{i \leq n} \beta_i \qquad nT < t \leq (n+1)T \quad (12)$$

and the phase for an MCPM signal is given by:

$$\phi(t) = 2\pi h \sum_{i \leq n} \alpha_i q(t - iT) \qquad nT < t \leq (n+1)T \quad (13)$$

As derived from Eqn. (1), the phase change of the MDPSK modulated signal over a one symbol period interval is equal to $$\frac{2\pi}{M} \beta_i$$

with $\beta_i \in \{0,1,2, \ldots (M-1)\}$ when the noise and ISI terms are neglected. As derived from Eqn. (13), the phase change for a MCPM modulated signal, over a one-symbol interval T of the received signal equals hπα$_i$ with $\alpha_i \in \{\pm 1, \pm 3, \ldots \pm (M-1)\}$, when the ISI and noise terms are neglected.

In accordance with an embodiment of the present invention, the pre-processor 400 maps the phase changes hπα$_i$ of the MCPM modulation format to the phase changes $$\frac{2\pi}{M} \beta_i$$

of the MDPSK modulation format, which is recognized by a MDPSK demodulator. In this way, the MCPM phase changes are transformed to MDPSK phase changes allowing a MDPSK demodulator to accurately demodulate the transformed MCPM phase changes.

In a pre-processor 400, the average phase changes of hπα$_i$ radians encountered in MCPM signals are transformed into phase changes of $$\frac{2\pi}{M} \beta_i$$

radians, with $\beta_i \in \{0,1,2, \ldots (M-1)\}$. The transformation may be achieved by applying two functions subsequently as illustrated in FIG. 13. First, at a phase multiplier 402, the phase of the MCPM signal is multiplied with a factor of $$\frac{1}{Mh}.$$

This scaling yields average phase changes of $$\frac{\pi}{M}\alpha_i.$$

The output of the phase multiplier 402 can be written as:

$$z(t)=a(t)e^{j\phi(t)/Mh} \quad (14)$$

The phase changes may then be offset, by a frequency shifter 404, by $$\frac{\pi}{M}$$

radians. The phase change offset results in the desired changes of $$\frac{2\pi}{M}\beta_i$$

radians, with $\beta_{i\in\{0,1,2,\ldots(M-1)\}}$. The phase change offset of $$\frac{\pi}{M}$$

radians per symbol period is equivalent to a frequency shift of $$\frac{1}{2M}$$

of the symbol rate. The output of the frequency shifter 404 may be written as:

$$u(t)=z(t)e^{j\pi\alpha/MT}=a(t)e^{j(\theta(t)/Mh+\pi\alpha/MT)}$$

In Eqn. (15), the β are mapped to α which belong to different signal alphabets. With the above pre-processing of the MCPM received signal, the MCPM phase changes over a one-symbol period have been transformed into MDPSK phase changes, allowing a MDPSK demodulator to be utilized for the demodulation of the MCPM signals.

Figure 14:
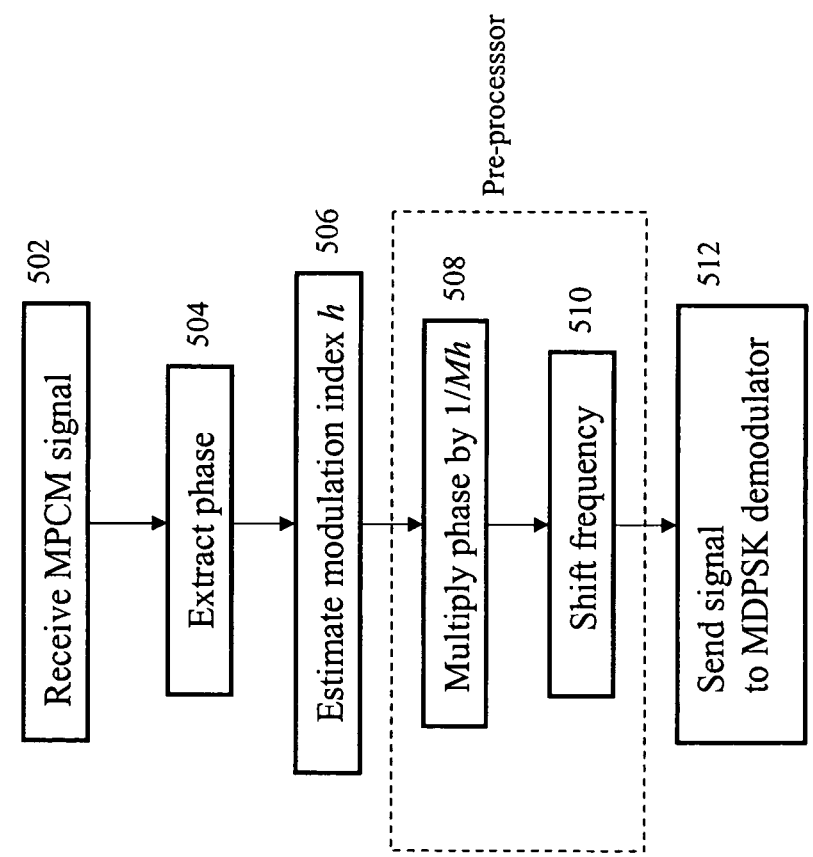
FIG. 14 is a flow diagram of a method of pre-processing a MCPM signal in accordance with an embodiment of the present invention.

Referring now to FIG. 14, a flow diagram illustrates a flow 500 for pre-processing a MCPM signal. At step 502, a MCPM signal is received at a device. At step 504, the phase of the MCPM signal is extracted. The modulation index h is estimated at step 506. The modulation index may be estimated by a processor according to the following equation: $v=(B^TC^{-1}B)^{-1}B^TC^{-1}\phi$. v represents a vector including elements representing scaled versions of estimates of the modulation index and the frequency offset. C represents a noise covariance matrix, B represents a data model matrix, and θ is an observation vector that represents a phase of the CPM signal. For a more detailed explanation of estimating the modulation index, please refer to U.S. patent application Ser. No. 10/603,469 filed Jun. 25, 2003 incorporated herein by reference. Although the modulation index h may be estimated by the process shown by U.S. patent application Ser. No. 10/603,469, various other methods of estimating the modulation index h may be utilized in conjunction with embodiments of the present invention. At step 508, the phase is multiplied by $$\frac{1}{Mh}$$

to yield average phase changes of $$\frac{\pi}{M}\alpha_i.$$

At step 510, the frequency is shifted by $$\frac{\pi}{M}$$

radians per symbol period, which is equivalent to a frequency shift of $$\frac{1}{2M}$$

of the symbol rate. At step 512, the pre-processed signal is transmitted to a demodulator for subsequent demodulation.

Although the above embodiment illustrates a specific demodulator that may be utilized in conjunction with the pre-processor of the present invention, the pre-processor may be utilized in conjunction with various other demodulators. Various embodiments of the present invention may be implemented in, for example, integrated circuits or chip sets, wireless systems, and receiver system products. For example, a computer is operative to execute software adapted to perform the demodulation techniques of the present invention. Demodulation software is adapted to reside on a computer readable medium, such as a magnetic disk within a disk drive unit. The computer readable medium may also include a flash memory card, EEROM based memory, bubble memory storage, ROM storage, etc. The software adapted to perform the demodulation method may also reside, in whole or in part, in the static or dynamic main memories or in firmware within a processor (i.e. within microcontroller, microprocessor or microcomputer internal memory). The demodulation method may also be applicable to implementations in integrated circuits, field programmable gate arrays (FPGAs), chip sets or application specific integrated circuits (ASICs), wireless systems, and other communication system products.

The term "receiver" used in this specification includes various kinds of wireless communication units present in a wireless communication system. Also, the present invention is not limited to single-band or single-mode receivers, but includes receivers serving at least one wireless communication system. The term "wireless device" used in this specification includes various kinds of portable or wireless communication equipment, such as mobile telephones, pagers, electronic organizers, smart phones, communicators, headsets, and other communication equipment.

While exemplary embodiment(s) of the present invention have been described, it should be recognized that the invention can be varied in many ways without departing therefrom.

Because the invention can be varied in numerous ways, it should be understood that the invention should be limited only insofar as is required by the scope of the following claims.

What is claimed is:

1. A pre-processor for processing M-ary Continuous Phase Modulation (MCPM) signals, the pre-processor comprising:
   a phase multiplier for multiplying a MCPM phase component by a scaling factor;
   a frequency shifter for shifting the scaled MCPM phase component incrementally by a frequency offset; and
   wherein the frequency offset allows a M-ary Differential encoded Phase Shift Keying (MDPSK) demodulator to demodulate the MCPM signal.

2. The pre-processor of claim 1, wherein the frequency offset corresponds to an angle in a complex plane of $$\frac{\pi}{M}$$

radians.

3. The pre-processor of claim 1, wherein the scaling factor corresponds to a scaling factor of $$\frac{1}{Mh},$$

wherein M is a modulation level and h is a modulation index.

4. The pre-processor of claim 1, wherein the pre-processor is implemented in a receiver of a wireless device.

5. The pre-processor of claim 1, wherein the pre-processor is implemented in a device operable in accordance with a short-range wireless scheme utilizing frequency hopping.

6. The pre-processor of claim 5, wherein the short-range wireless scheme is a BLUETOOTH scheme.

7. The pre-processor of claim 1, wherein the pre-processor is utilized in conjunction with a M-ary Differential encoded Phase Shift Keying (MDPSK) demodulator.

8. The pre-processor of claim 7, wherein the MDPSK demodulator is a semi-coherent demodulator.

9. A method for pre-processing a M-ary Continuous Phase Modulation (MCPM) signal, the method comprising the steps of:
   receiving a MCPM signal;
   extracting a phase component of the received MCPM signal;
   multiplying the phase component of the received MCPM signal by a scaling factor; and
   shifting a frequency of the phase-multiplied MCPM signal.

10. The method of claim 9, further comprising the step of estimating a modulation index h, wherein the scaling factor is $$\frac{1}{Mh}$$

and wherein M is a modulation level.

11. The method of claim 9, wherein the step of shifting a frequency comprises the steps of incrementally shifting the scaled phase component by $$\frac{\pi}{M}$$

radians.

12. The method of claim 9, wherein the received MCPM signal is received at a wireless device.

13. The method of claim 9, wherein the received MCPM signal is received at a device operable in accordance with a short-range wireless scheme utilizing frequency hopping.

14. The method of claim 9, further comprising transmitting the frequency-shifted and phase-multiplied MCPM signal to a M-ary Differential encoded Phase Shift Keying (MDPSK) demodulator.

15. The method of claim 14, wherein the MDPSK demodulator is a semi-coherent demodulator.

16. An article of manufacture for demodulation of an input signal, the article of manufacture comprising:
   at least one computer readable medium;
   processor instructions contained on the at least one computer readable medium, the processor instructions configured to be readable from the at least one computer readable medium by at least one processor and thereby cause the at least one processor to operate as to:
   receive a M-ary Continuous Phase Modulation (MCPM) signal at a device;
   extract a phase component of the received MCPM signal;
   multiply the phase component of the received MCPM signal;
   shift a frequency of the phase multiplied MCPM signal; and
   a demodulator for demodulating the scaled and shifted phase component of the received MCPM signal.

17. The article of manufacture of claim 16, further comprising the step of estimating a modulation index h, wherein the scaling factor is $$\frac{1}{Mh}$$

and wherein M is a modulation level.

18. The article of manufacture of claim 16, wherein the step of shifting a frequency comprises the steps of incrementally shifting the scaled phase component by $$\frac{\pi}{M}$$

radians.

19. The article of manufacture of claim 16, wherein the article of manufacture is stored on a wireless device.

20. The article of manufacture of claim 16, wherein the article of manufacture is stored on a device operable as a short-range wireless scheme utilizing frequency hopping.

21. The article of manufacture of claim 16, wherein the article of manufacture is stored on a short-range wireless device.

22. The article of manufacture of claim 16, wherein the step of receiving is performed at an antenna of the device.

23. A receiver for demodulating received M-ary Continuous Phase Modulation (MCPM) signals, the receiver comprising:

a pre-processor for transforming a modulation format of a received MCPM signal to a modulation format of a MDPSK signal; and a M-ary Differential encoded Phase Shift Keying (MDPSK) demodulator for demodulating the transformed MCPM signal, wherein the pre-processor further comprises:

a phase multiplier for multiplying a MCPM phase component by a scaling factor;

a frequency shifter for shifting the scaled MCPM phase component to create a frequency offset; and wherein the frequency offset allows the MDPSK demodulator to demodulate the MCPM signal.

24. The receiver of claim 23, wherein the receiver is implemented in a device operable in accordance with a short-range wireless scheme utilizing frequency hopping.

25. The receiver of claim 24, wherein the short-range wireless scheme is a BLUETOOTH scheme.

26. The receiver of claim 23, wherein the MDPSK demodulator is a semi-coherent demodulator.

27. The receiver of claim 23, wherein the scaling factor is $$\frac{1}{Mh}$$

and wherein M is a modulation level and h is the modulation index.

28. The receiver of claim 23, wherein the frequency offset corresponds to an angle in a complex plane of $$\frac{\pi}{M}$$

radians.

* * * * *

UNITED STATES PATENT AND TRADEMARK OFFICE
CERTIFICATE OF CORRECTION

PATENT NO.       : 7,415,078 B2
APPLICATION NO.  : 10/850687
DATED            : August 19, 2008
INVENTOR(S)      : Smit It is certified that error appears in the above-identified patent and that said Letters Patent is hereby corrected as shown below:

On the Title Page Item (73), under "Assignee", Line 2, delete "(DE)" and insert -- (SE) --, therefor.

In Column 1, Line 58, in Equation (1), delete "$x(t)=A(t)\cdot e^{j\theta(t)} i=1,2,3$" and insert -- $x(t)=A(t)\cdot e^{j\theta(t)}$  $i=1,2,3...$ --, therefor.

In Column 3, Line 32, in Equation (3), delete " $x_i = A_i^{100} e^{j\theta_i^{100}} i=1,2,3$ " insert -- $x_i = A_i^{100} e^{j\theta_i^{100}}$  $i=1,2,3...$ --, therefor.

In Column 4, Line 20, delete "$r_{-1}^{100}$" and insert -- $r_{i-1}^{100}$ --, therefor.

In Column 8, Line 10, delete "$\psi_i^{100}$," and insert -- $\psi_{i-1}$, --, therefor.

In Column 8, Line 22, delete "$\psi_i^{200}$:" and insert -- $\psi_i^{200}$: --, therefor.

In Column 8, Line 42, in Equation (8), delete " $\vartheta_i^{200} = \arg(\lambda + (1-\lambda)\cdot e^{j(\xi_i - \psi_{i-1})}$ " and insert -- $\vartheta_i^{200} = \arg(\lambda + (1-\lambda)\cdot e^{j(\xi_i - \psi_{i-1})})$ --, therefor.

In Column 9, Line 2, delete "$\pi$," and insert -- $\lambda$, --, therefor.

In Column 9, Line 45, delete " $\psi_{i-1}^{200}$ " and insert -- $\psi_{i-1}^{200}$ --, therefor.

In Column 11, Line 27, delete " $\beta_{i \in \{}0,1,2,...(M-1)\}$. " and insert -- $\beta_i \in \{0,1,2,...(M-1)\}$. --, therefor.

In Column 11, Lines 57-58, delete "$v=(B^T C^{-1} B)^{-1} B^T C^{-1} \phi$." and insert -- $v=(B^T C^{-1} B)^{-1} B^T C^{-1} \phi$. --, therefor.

UNITED STATES PATENT AND TRADEMARK OFFICE
CERTIFICATE OF CORRECTION

PATENT NO. : 7,415,078 B2
APPLICATION NO. : 10/850687
DATED : August 19, 2008
INVENTOR(S) : Smit It is certified that error appears in the above-identified patent and that said Letters Patent is hereby corrected as shown below:

In Column 11, Line 61, delete "θ" and insert -- Φ --, therefor.

Signed and Sealed this

Seventh Day of April, 2009

JOHN DOLL
*Acting Director of the United States Patent and Trademark Office*